United States Patent [19]

Schlunz et al.

[11] Patent Number: 4,598,472
[45] Date of Patent: Jul. 8, 1986

[54] METHOD FOR FORMING A HEMISPHERICALLY SHAPED SWITCH ASSEMBLY

[75] Inventors: James R. Schlunz; Donald G. Stillie, both of Winston-Salem, N.C.

[73] Assignee: AMP Incorporated, Harrisburg, Pa.

[21] Appl. No.: 524,956

[22] Filed: Aug. 19, 1983

[51] Int. Cl.$^4$ .................................................. H05K 3/12
[52] U.S. Cl. ........................................ 29/848; 29/846;
156/285; 200/159 B
[58] Field of Search ................. 29/846, 848, 849, 825;
156/285; 200/159 B

[56] References Cited

U.S. PATENT DOCUMENTS

| | | | |
|---|---|---|---|
| 3,732,389 | 5/1973 | Kaelin et al. | 200/159 B X |
| 3,818,823 | 6/1974 | Bond | 156/285 X |
| 3,860,771 | 1/1975 | Lynn et al. | 200/5 A |
| 3,886,335 | 5/1975 | Hendricks | 200/1 R |
| 4,066,853 | 1/1978 | Zenk | 200/5 A |
| 4,066,855 | 1/1978 | Zenk | 200/5 A |
| 4,143,253 | 3/1979 | Wagner et al. | 200/5 A |
| 4,194,938 | 3/1980 | Figge et al. | 156/224 X |
| 4,360,716 | 11/1982 | Fiorella | 200/5 A |
| 4,407,685 | 10/1983 | Hankland | 156/285 X |
| 4,463,055 | 7/1984 | Hodges | 156/285 X |

FOREIGN PATENT DOCUMENTS 24228 3/1956 Fed. Rep. of Germany ...... 156/285

OTHER PUBLICATIONS

IBM Tech. Discl. Bulletin, vol. 15, No. 2, Jul. 1972, pp. 544-545 by Goodman et al.
IBM Tech. Discl. Bull., vol. 9, No. 10, Mar. 1967, p. 1411 by R. F. Penoyer.

Primary Examiner—Howard N. Goldberg
Assistant Examiner—Carl J. Arbes
Attorney, Agent, or Firm—Katherine A. Nelson

[57] ABSTRACT

A hemispherically shaped membrane switch assembly for attaching to generally hemispherical surfaces such as cathode ray tubes is disclosed. Also disclosed are a method and apparatus for forming the assembly. The assembly is comprised of two layers of transparent film having spaced-apart conductors on the internal surfaces of both layers. The internal surfaces are separated by spacing means, the spacing means being discontinuous at the switch sites. The conductors on the two layers cross and are spaced apart at the switch sites. The assembly is hemispherically formed to the same radius as the hemispherical surface on which the assembly is to be mounted. The assembly mounts flush to the hemispherical surface and conforms uniformly to its surface thus reducing distortion and parallax.

4 Claims, 13 Drawing Figures

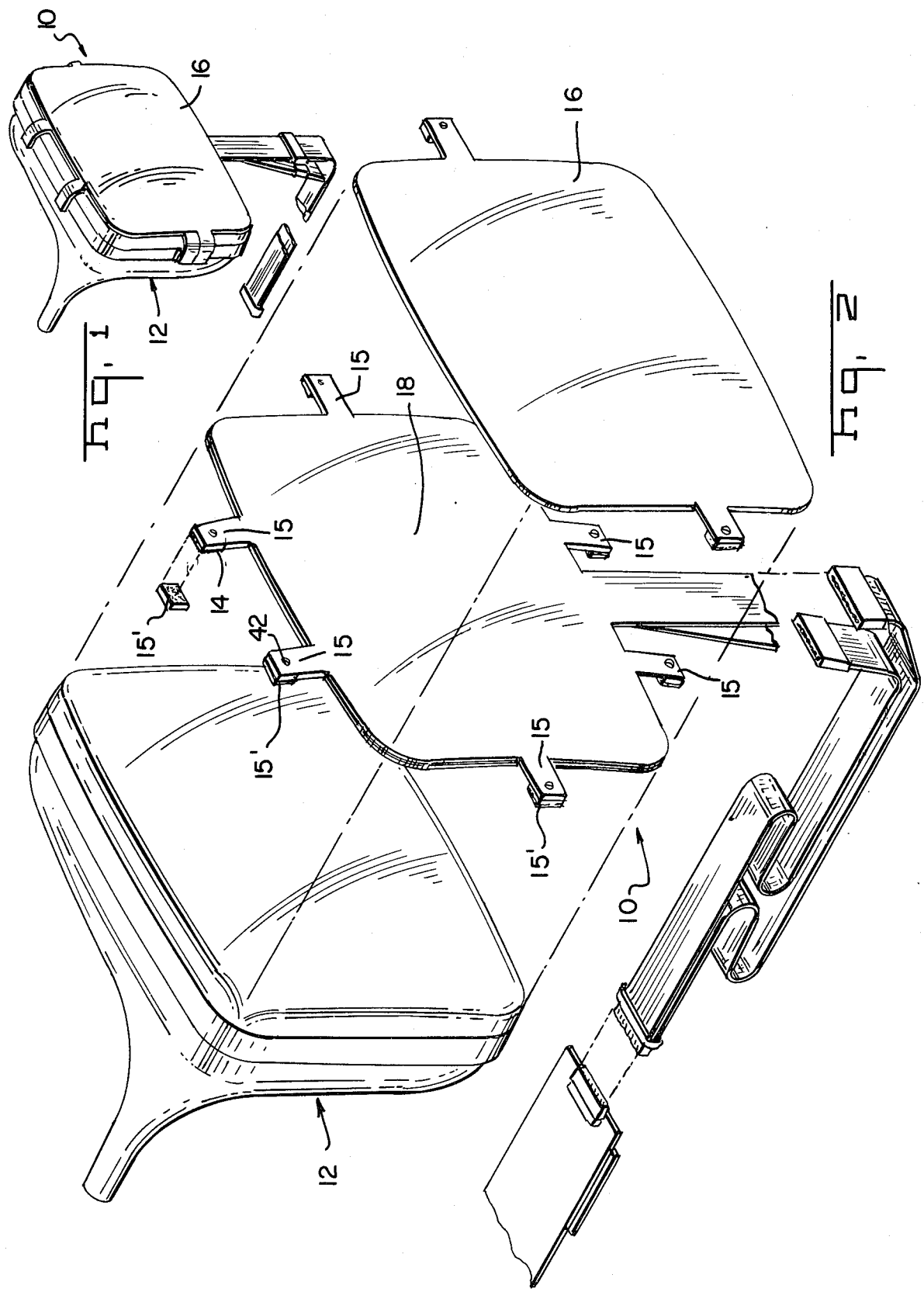

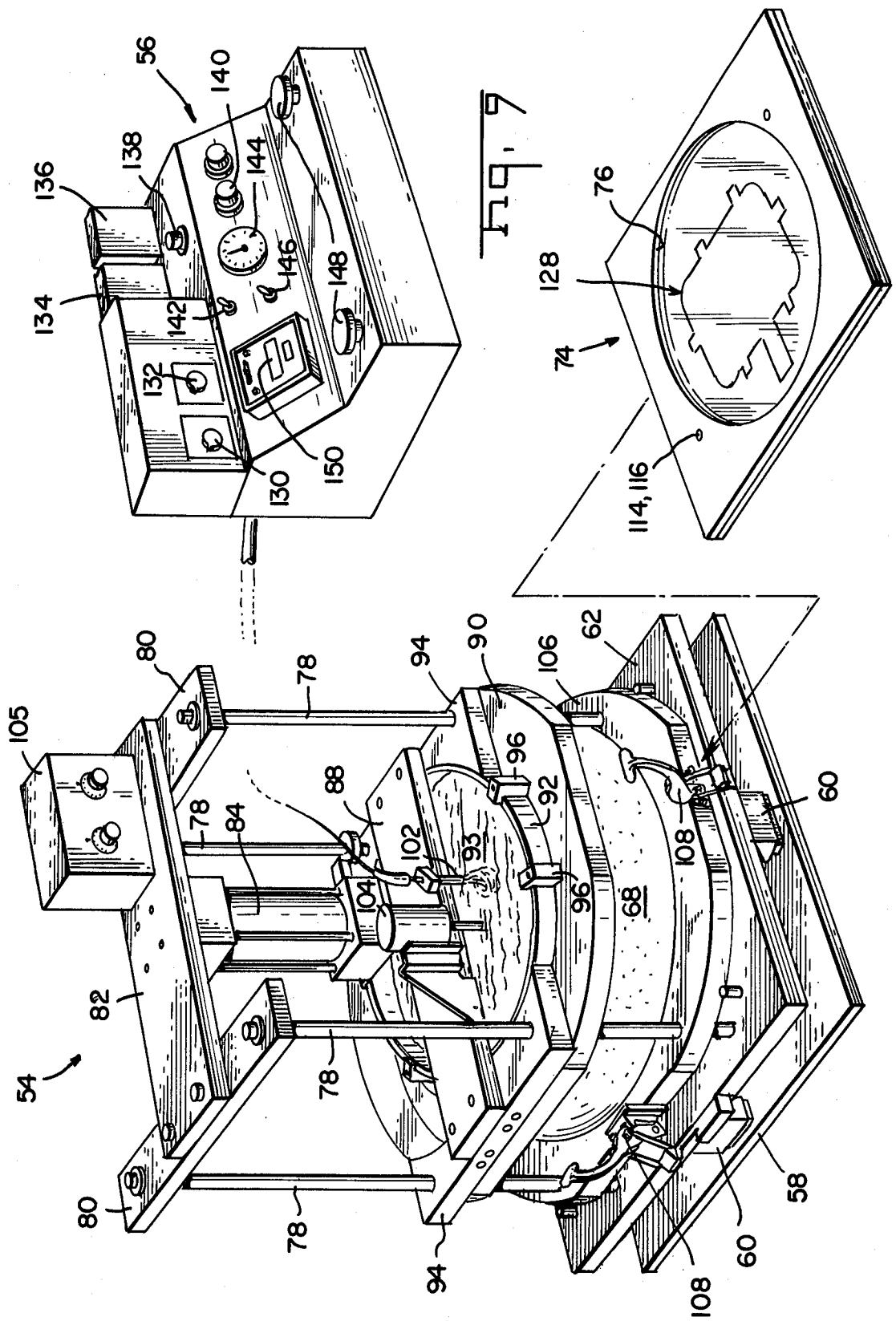

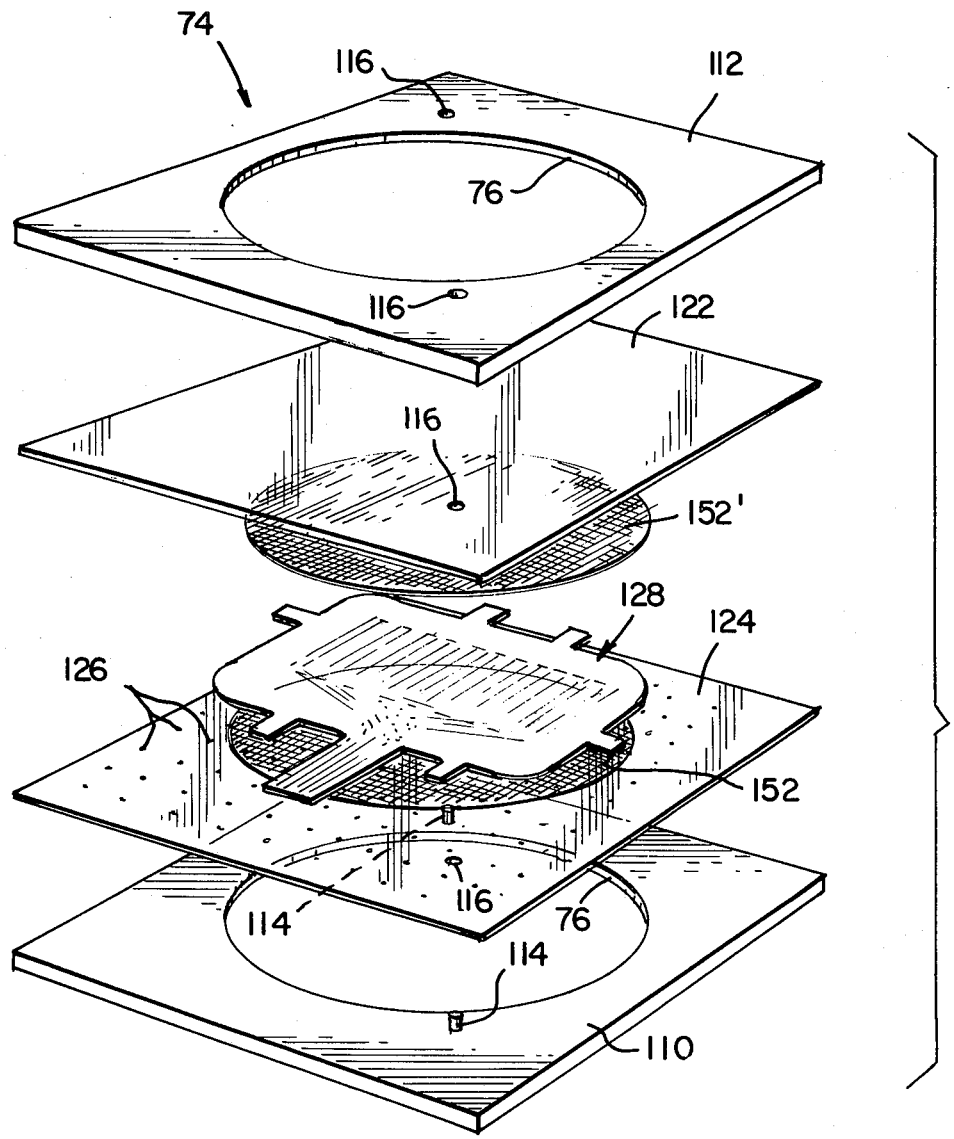

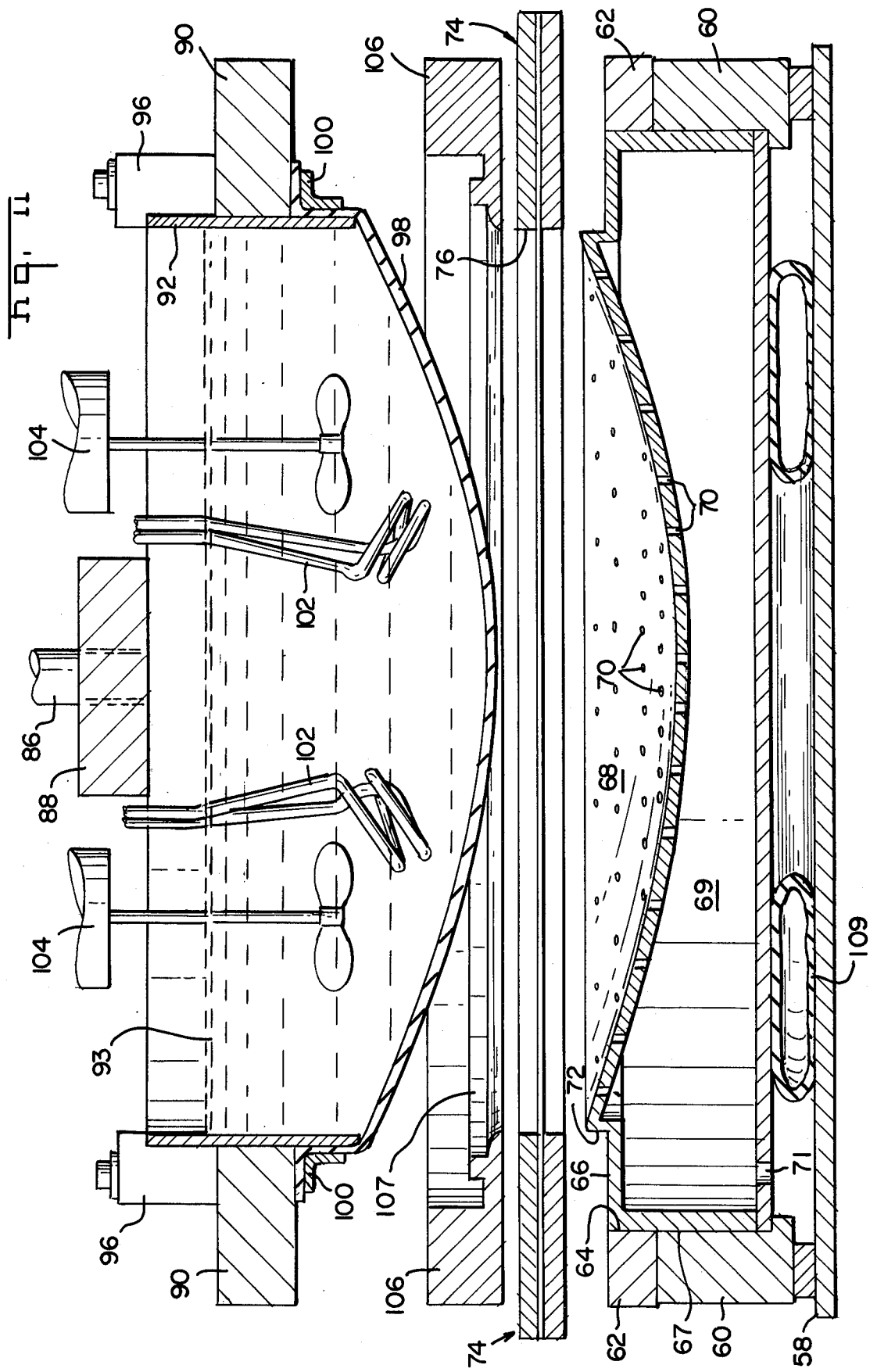

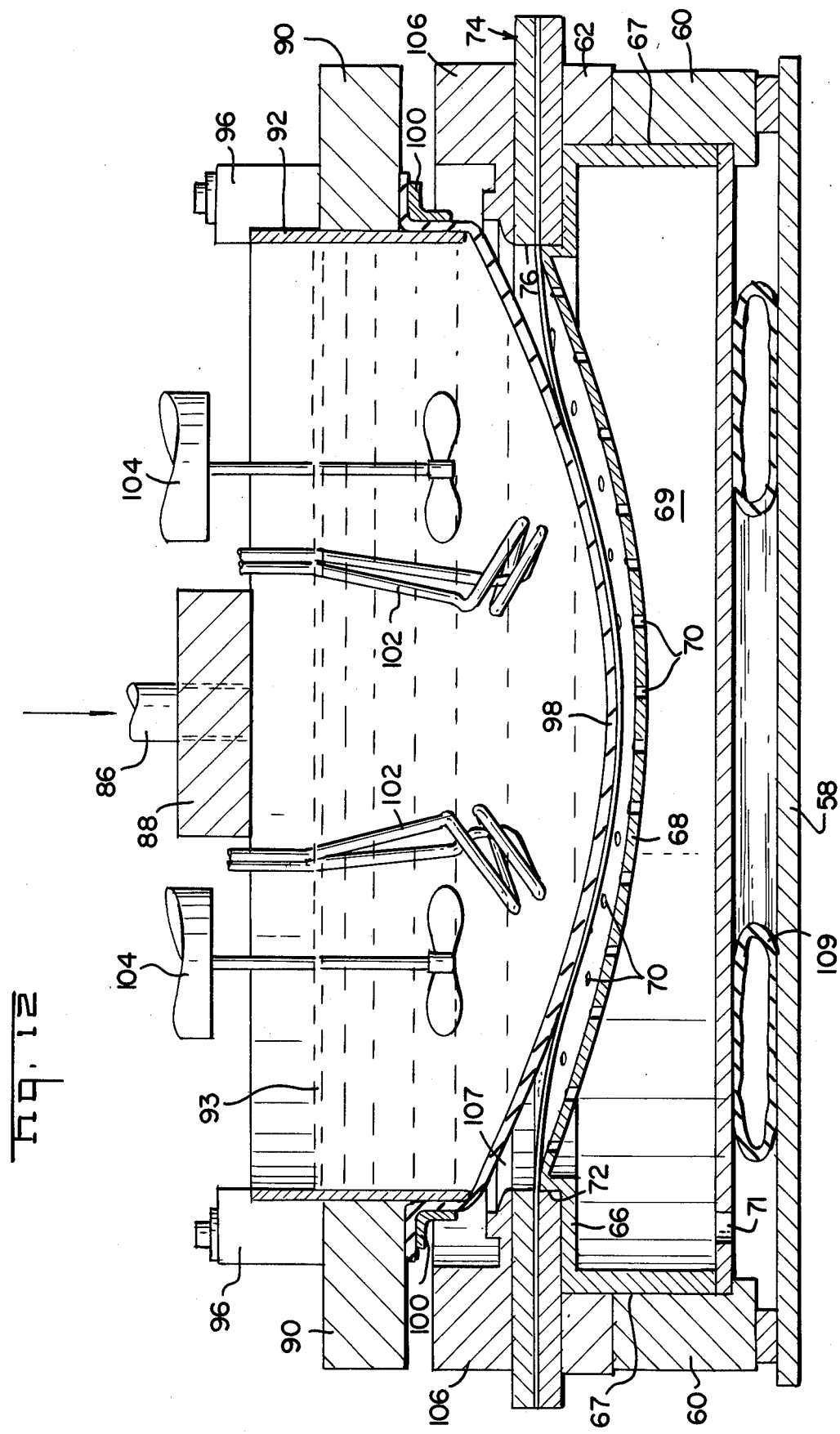

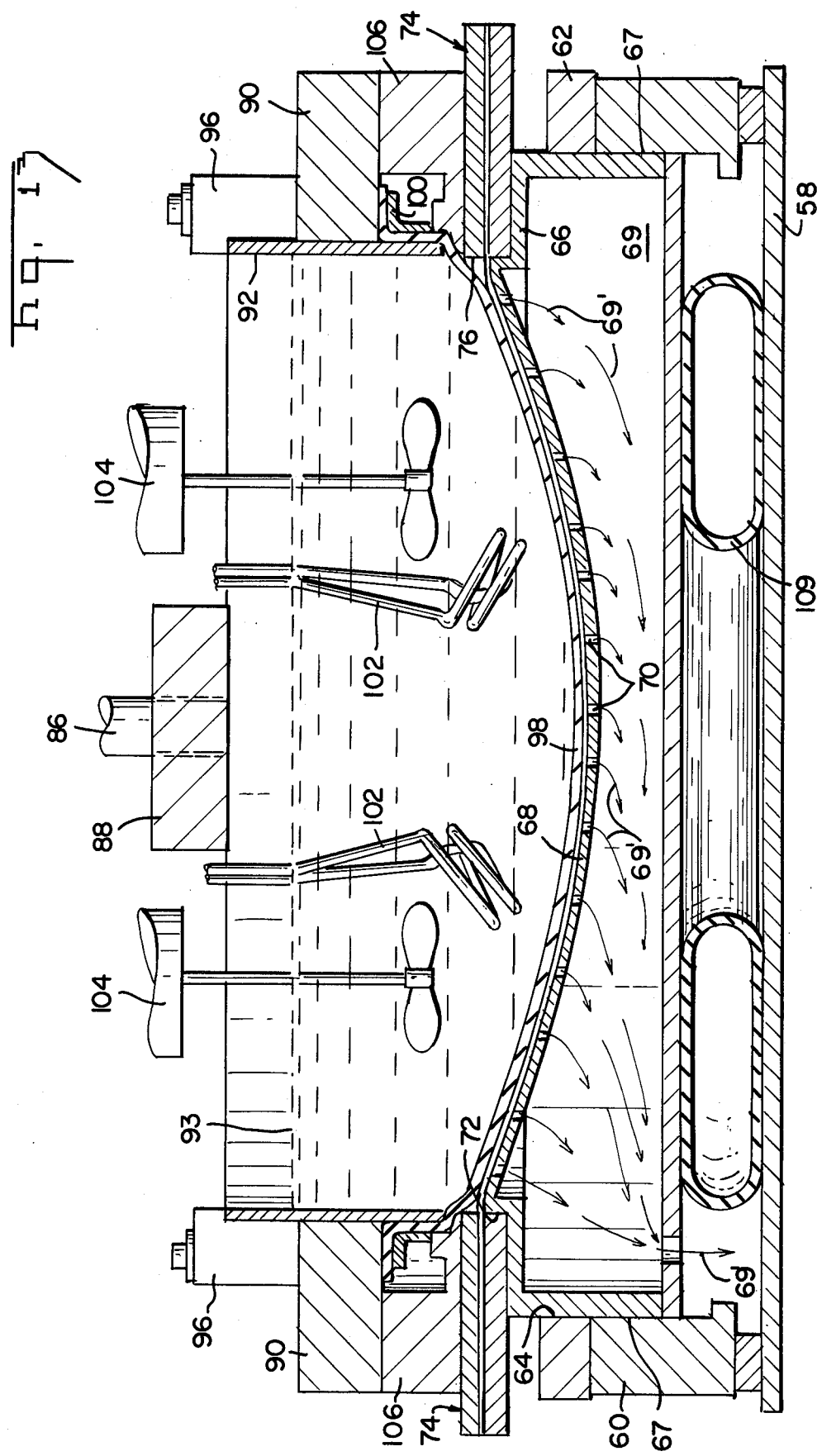

METHOD FOR FORMING A HEMISPHERICALLY SHAPED SWITCH ASSEMBLY

FIELD OF THE INVENTION

This invention relates to membrane switch assemblies of the type that are used on hemispherical surfaces such as cathode ray tubes.

BACKGROUND OF THE INVENTION

In today's technological world, there is an increasing need for membrane switch assemblies that can be mounted on hemispherical surfaces such as cathode ray tubes (CRT's). An ever increasing amount of software is becoming available that requires the user to answer questions by pressing appropriate areas of a CRT equipped with a membrane switch assembly.

These assemblies are generally made from two layers of essentially transparent film, the internal surfaces of each layer having conductors deposited thereon, separated by a third layer of film containing openings for switch sites. The conductors on the layers cross and are normally spaced from each other at the switch sites.

When such a device is operated, it is highly desirable that the assembly be essentially optically clear to the operator. For this reason, assemblies having wide conductors are generally unacceptable. The wide conductive traces are visible to the naked eye. Assemblies of the type having narrow conductors, particularly hairline conductors are generally more acceptable.

Use of hairline conductors can cause problems in forming the layer of film to the desired hemispherical radius in that the hairline conductors break during the forming process, thus rendering the switch inoperable. Hemispherically forming the circuit layers according to the method as disclosed herein, solves the abovementioned problem. An apparatus for the performing the method is also disclosed herein.

DESCRIPTION OF DRAWINGS

FIG. 1 is a three dimensional view of the preferred embodiment of the switch assembly and a filter mounted on a cathode ray tube.

FIG. 2 is an exploded view of the device shown in FIG. 1.

FIG. 9 is a three dimensional drawing of a forming apparatus in accordance with the invention.

FIG. 10 is an exploded perspective view of the components within the holding frame.

FIG. 11 is a cross-sectional view of a forming apparatus in its open position.

FIG. 12 is a cross-sectional view of the forming apparatus in a partially closed position.

FIG. 13 is a cross-sectional view of the forming apparatus in its closed position.

PREFERRED EMBODIMENT OF THE INVENTION

Figure 3:
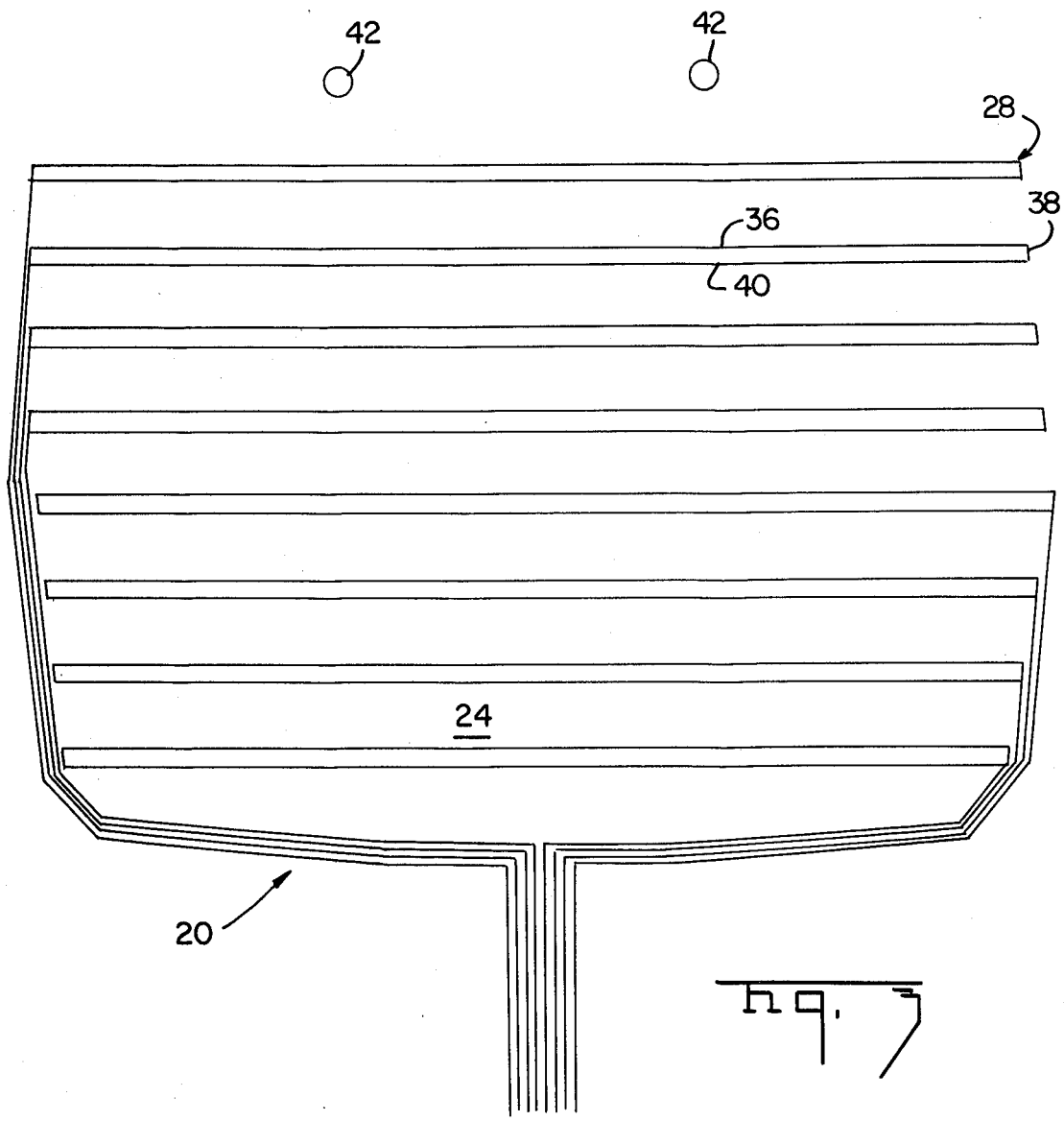
FIG. 3 is an orthographic view of the pattern of double conductors deposited on one layer of the film.

Referring to FIGS. 1 and 2, a switch assembly 10 is intended for mounting on a cathode ray tube 12. These figures illustrate the use of mounting means 14, as disclosed in U.S. Pat. No. 4,427,861. The mounting means 14, is comprised of extensions 15 which protrude along the outer perimeter of the switch assembly 10 and hook and loop type fastening means 15. These figures also illustrate the use of a filter 16 disposed over the external surface 18 of the switch assembly 10.

Figure 6:
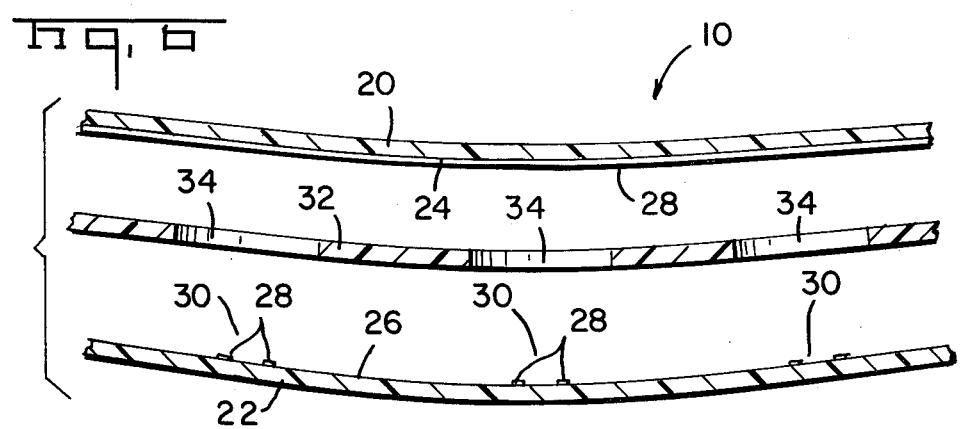
FIG. 6 is an exaggerated diagrammatic cross-sectional view of a portion of the switch assembly.

Referring now to FIG. 6, the assembly 10 is comprised of two layers 20 and 22 of substantially transparent film, the internal surfaces 24 and 26 of layers 20 and 22 having a plurality of conductors 28 thereon, the conductors crossing and being normally spaced from each other at the switch sites 30, the layers 12 and 16 being separated from each other by spacing means 32, the spacing means being a layer of substantially transparent film having openings 34 therein at switch sites 30.

Figure 4:
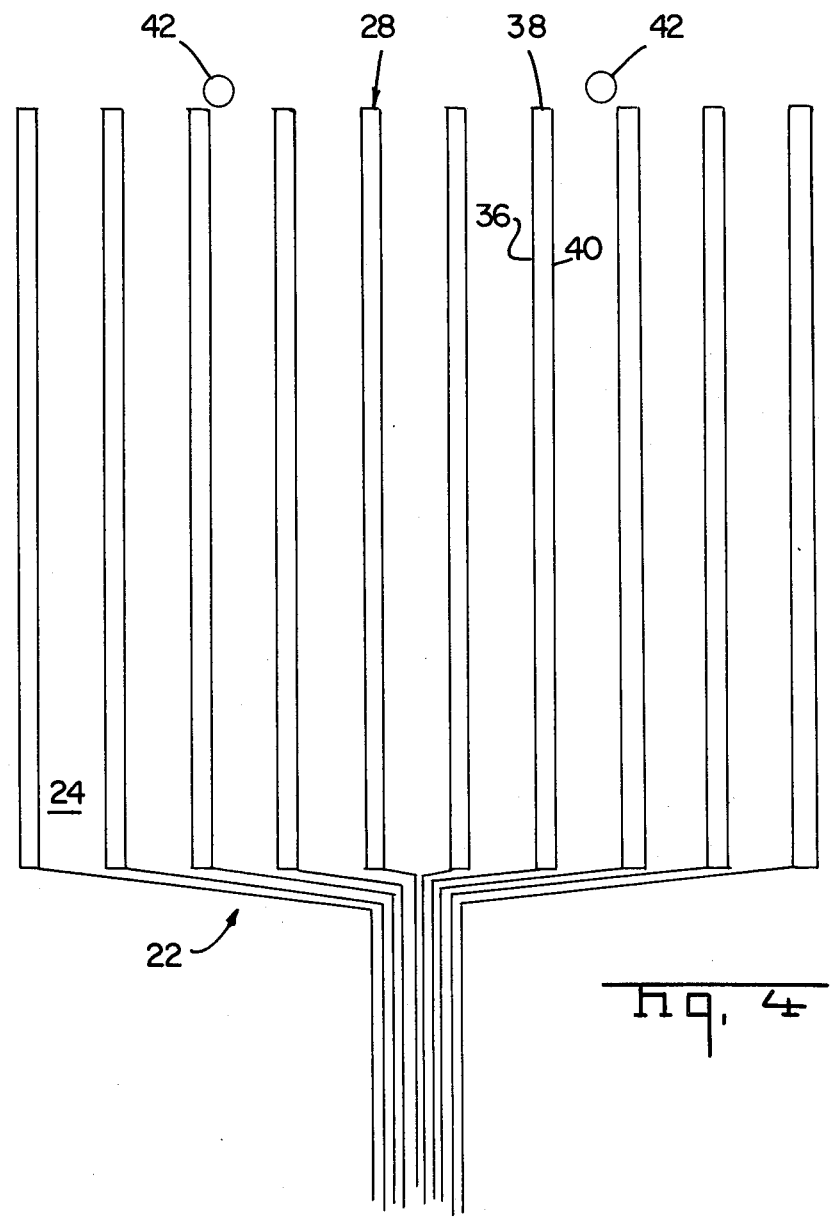
FIG. 4 is an orthographic view of the pattern of double conductors deposited on the second layer of film.

The conductors 28 as shown in FIGS. 3 and 4 are double hairline conductors, each double conductor has a first portion 36, an intermediate portion 38 and a second portion 40. Each conductor 28 is reversely bent in its intermediate portion 38 so that the first and second portions 36 and 40 of the conductor are spaced apart and essentially parallel to each other.

As further illustrated in FIGS. 3 and 4, the conductors 28 are deposited on the internal surface 24 of the first layer 20 in a direction normal to the direction of the double conductors 28 deposited on the second layer 22. As is shown in FIG. 5, the conductors 28 on the two layers 20 and 22 cross and are normally spaced apart at the switch sites 30.

Figure 5:
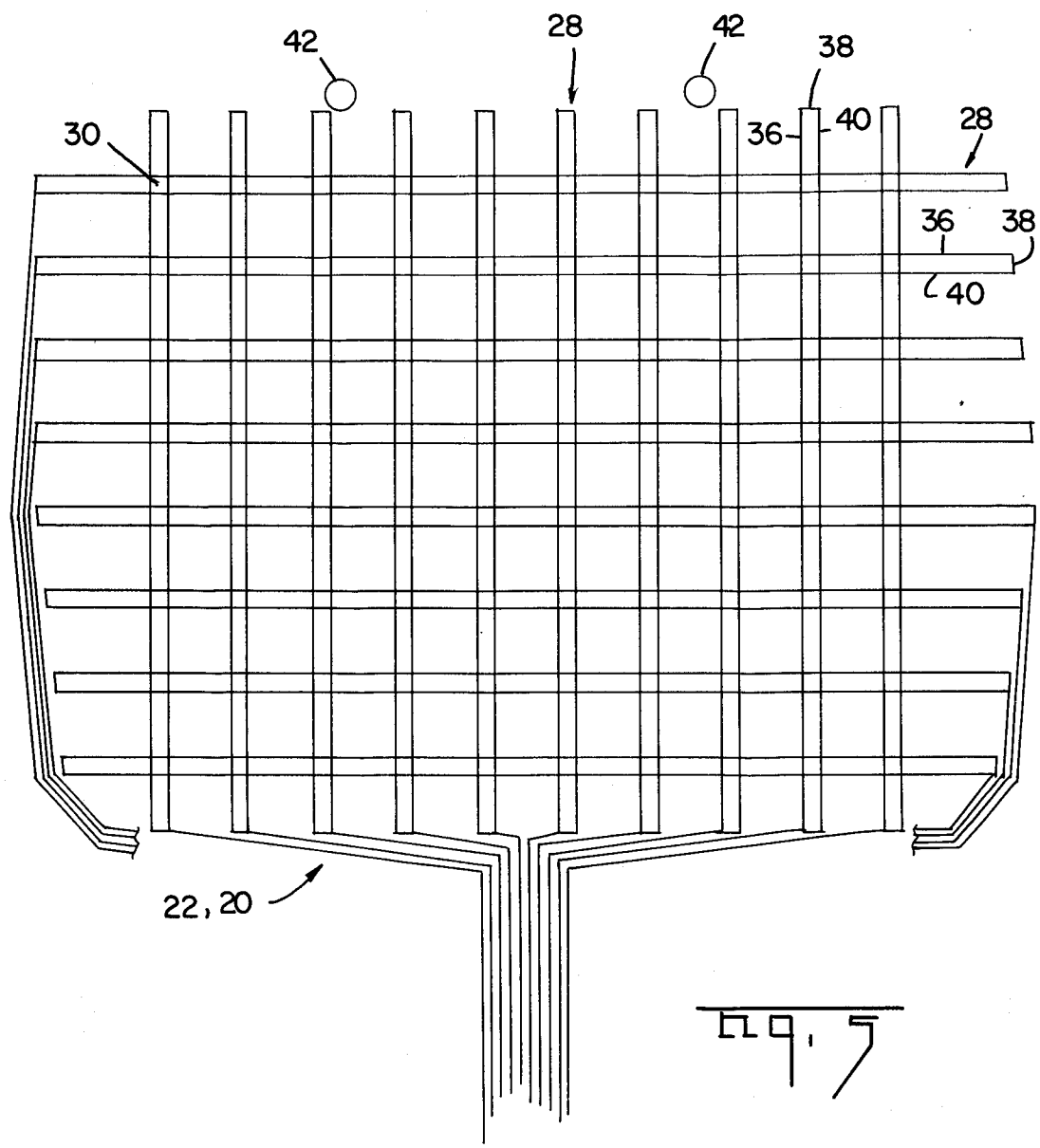
FIG. 5 is an orthographic view of the double conductor pattern of the completed switch assembly.

FIGS. 3, 4, and 5 also illustrate aligning holes 42 used to align the layers when assembling the formed switch.

Figure 7:
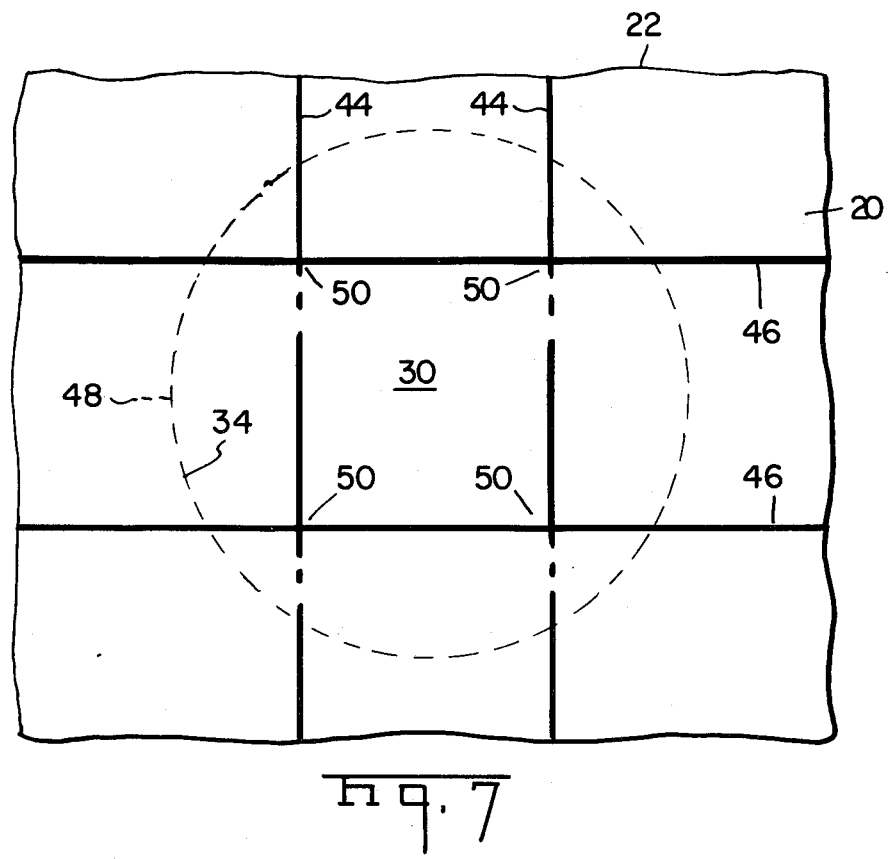
FIG. 7 is an enlarged fragmentary view illustrating the target area of one switch site in the preferred embodiment.

FIG. 7 represents one switch site of the preferred embodiment. The phantom straight lines 44 represent the first and second portions of a double conductor on the lower layer 22. The solid straight lines 46 represent the first and second portions of a double conductor on the upper layer 20. The phantom circular line 48 represents the opening 34 in the spacing means 32, and the switch site 30 is within 48. As is seen in FIG. 7, the conductors on the lower and upper layers cross each other at four contact points 50.

Figure 8:
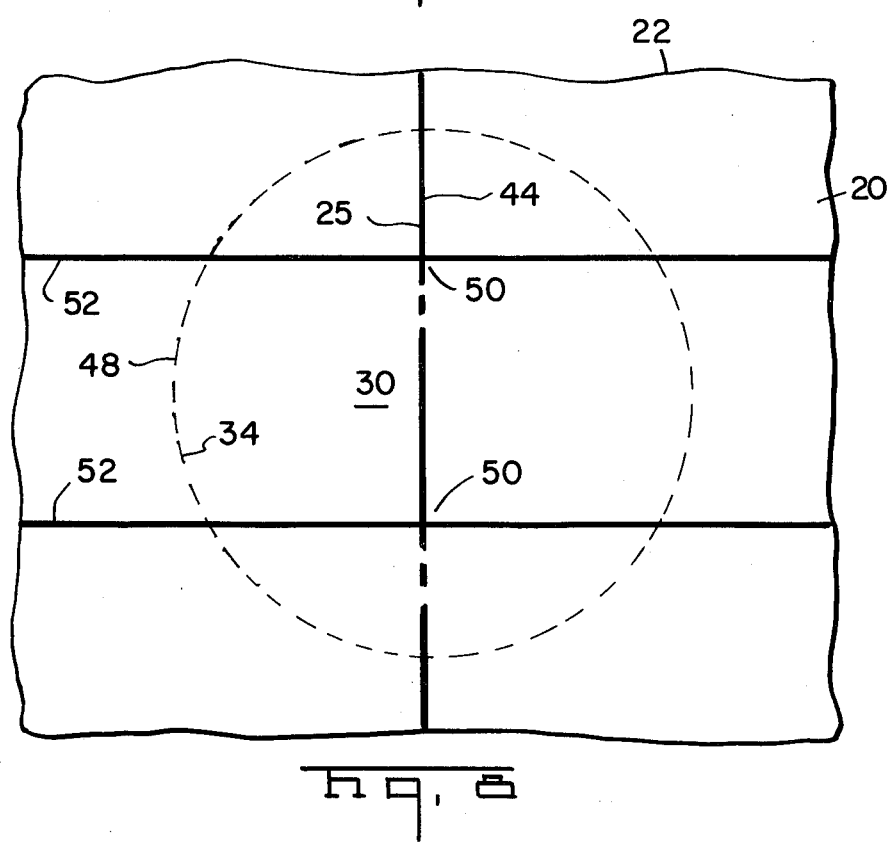
FIG. 8 is an enlarged fragmentary view illustrating the target area of one switch site of an alternative embodiment.

FIG. 8 represents a switch site in an alternative embodiment. The phantom straight line 52 represents a single hairline conductor on the first lower layer 22. The solid lines 46 represent a double conductor on the upper layer 20. The phantom circular line 48 represents the opening in the spacer 34 at the switch site 30. In this embodiment, contact points 50 are formed at the two locations where the single conductor crosses the double conductor within the switch site area.

The forming apparatus 54 and the control panel 56 are illustrated in FIG. 9. As seen in FIGS. 9, 11, 12, and 13, the apparatus 54 has a main base plate 58, four standoffs 60 separate the main base plate from a second base plate 62. As is shown in FIGS. 11, 12 and 13, the base plate 62 has a cavity 64 therein. A forming disc and piston unit 66 rest in the cavity of the base plate.

An expandable piston raising cylinder 109, as seen in FIGS. 11, 12, and 13, is used to raise the piston during the forming operation.

The unit 66 has a forming dish portion 68 and a piston unit portion 67. The piston portion 67 has an evacuation chamber 69 inside it. The chamber 69 has an opening 71 through which air is evacuated during the forming process. The forming dish portion 68 has a plurality of holes 70 through the dish and into the chamber 69. The dish portion 68 has a raised area 72 around its periphery.

A removable frame member 74 is positioned above the forming dish portion. The frame member has an opening 76 which cooperates with the raised dish portion 72 thus holding the frame member 74 around the dish.

The removable frame member 74 is held in the apparatus by a clamping plate 106, as can be seen in FIGS. 9, 11, 12, and 13. Latching members 108 on the clamping plate 106 hold the frame member in place during the forming operation. The clamping plate 106 has a cavity 107 therein.

Returning now to FIG. 9, the forming apparatus 54 has four support and guide rods 78 extending from the base 62 to the cross members 80 at the top of the apparatus. A holding plate 82 extends between the cross members 80. Attached to the holding plate is an air cylinder 84. The air cylinder 84 contains a piston rod 86 as is shown in FIGS. 11, 12, and 13. The end of the piston rod is attached to the plate 88.

Referring again to FIGS. 9, 11, 12, and 13, the forming apparatus is further comprised of a sliding member 90. The sliding member 90 supports the drum member 92. The drum member is held to the sliding member by mounting means 96. The drum is further supported by a drum support member 94. The plate 88 is attached to the drum support member 94.

As seen in FIGS. 11, 12, and 13, the lower portion of the drum 92 has a rubber bladder 98. The bladder 98 is attached to the sliding member 90 by a flange 100. The lower portion of the drum fits within opening 107 into clamping plate 106.

The drum member has oil 93 contained therein. In addition to the oil 93, the drum contains heaters 102 and stirrers 104 which maintain the desired uniform temperature. As seen in FIG. 9, stirring motor control 105 is attached to the holding plate 82.

A flexible member is used at the lower portion of the drum so that the member can conform uniformly to the shape of the forming dish. Thus, various forming dishes having different hemispherical radii can be used with the same drum unit. Oil is used in the drum to maintain uniform forming temperature for the switch layers.

Referring now to FIG. 10, the removable frame 74 is comprised of a lower metal plate 110 and an upper metal plate 112. Between the two metal plates 110 and 112 are two switch retaining layers of thermoplastic film, a lower layer 124 and an upper layer 122. The lower metal plate 110 has two aligning pins 114, the switch retaining layers 122 and 124, and the upper metal plate 110 have aligning holes 116 which cooperate with pins 114 to hold the frame together. The lower switch retaining layer 124 has a plurality of perforations 126 therein, through which air can be evacuated during the forming operation. FIG. 10 also shows a profiled layer of film 128 having conductors thereon and two flexible mesh sheets 152 and 152', which may be used to protect the surface of the film layer. The film 128 is in position for forming. The film 128 and mesh sheets 152 and 152' are freely held between the two switch retaining layers 122 and 124, as shown in FIG. 9. No portion of the profiled switch or mesh sheets as held between the plates 110 and 112.

Referring again to FIG. 9, the control panel 56 has resettable timers 130 and 132 for timing the heating and cooling cycle of the apparatus, vacuum and air manifolds 134 and 136, a pressure regulating device 138 for raising the dish and piston unit 66, and air cylinder pressure control 140. The control further has main power, heating, and starting switches 142, 146, and 148. The panel also shows pressure gage 144 for the air cylinder and an oil temperature control and meter 150.

In making the membrane switch assembly, the first step is to apply conductors to sheets of flexible film. A number of methods can be used for producing selected conductive patterns on the film. The conductors can be electrodeposited by methods which are disclosed in numerous patents, among them U.S. Pat. Nos. 3,259,559, 3,562,005, and 4,143,253. Conductors can also be screened onto sheets of film. The width of the ink lines depends primarily on the size of particles in the screenable inks. Ink lines that are approximately 5 mils wide can be obtained by using inks having particles that can pass through a fine mesh screen. One ink that can be used is Polymeric Conductor Composition 5007, available from E. I. DuPont de Nemours & Co., Inc., Wilmington, Del. 19898.

The conductors in the preferred embodiment are deposited as double hairlines in order to provide for redundancy at the switch sites. Each switch site has four possible contact points. Closing any one or more of them will complete the circuit. Redundancy is a desirable feature to ensure that electrical contact will still be made at the site in the event force is applied at the outside edge of the switch site rather than the center of the site. Redundancy is also a desirable feature to ensure that electrical contact will be made in the event a break should occur in one of the hairline conductors.

Numerous other conductor patterns can also be used, such as one or more single line conductors on both layers, one or more single line conductors on one layer with one or more double line conductors on the other, which provides two contact points per site and circuit conductors on one layer with commoning conductors on the second layer.

In the preferred embodiment, the lines of the double hairline conductor are approximately 5 mils wide, but other width lines may also be used. The distances between the two lines of each conductor and the adjacent conductors vary according to the number and size of switch sites. The switch sites need to be sufficiently spaced apart so that when force is applied to the site, the circuit is completed only at the desired site. Furthermore, the size and curvature of the cathode ray tube present problems of parallax. The switch site must be of sufficient size to permit actuation even when the force is not applied in a direction normal to the site.

After the conductors have been deposited, individual layers are profiled to shape. The profiled areas include means for aligning the separate layers to form the assembly. The aligning means in the preferred embodiment consists of two aligning holes 42 near the periphery of the switch area, preferably in the extensions 15, as shown in FIG. 2.

After profiling, the layers are formed to the desired hemispherical radius. The layers may be formed individually or one or more layers of film may be formed together. In forming the layers, the profiled film is placed between the two retaining layers of film 122 and 124, as shown in FIG. 10. A sheet of flexible mesh 151, 152' may be placed above and below the profiled film to protect the surface during forming. Use of the mesh, particularly against the lower retaining layer helps to insure that the vacuum is applied evenly. The mesh provides support to the film and prevents the film from being drawn into the perforations 126. If the profiled film is placed in between the layers with the conductor surface toward the top retaining film layer 122, the hemispherically formed layer has the conductors on its concave surface. Reversing the profiled film so that the conductor surface is against the lower retaining film 124 produces a hemispherically formed layer having conductors on its convex surface.

It is essential to the invention that the profiled circuit layer be freely held by the retaining layers of thermoplastic film. The conductors will break during the forming operation if the circuit layer is held in a rigid position. The heating of the film prior to the evacuation of any remaining air that has been trapped between the film layers insures that the circuit layer has remained freely held during the forming operation.

Frame member 74 is assembled and placed into the apparatus. The opening 76 in the frame member being aligned with the raised area 72 of the dish. The clamping plate 106 is latched onto the frame member 74.

FIG. 11 shows the apparatus in its open position with the frame member 74 above the dish portion prior to the clamping plate 106 being latched. The lower edge of the drum member extends into opening 107 in clamping plate 106.

The oil 93 in the drum member 92 is brought to the desired temperature prior to forming the switch layers. The use of heaters and stirrer motors insures a uniform temperature throughout the oil. The drum member 92 containing the hot oil, is lowered further into the opening and against the retaining film by activating the air cylinder 84. FIG. 12 shows the drum member in its lowered position. The rubber bladder presses against the upper layer of the retaining film in the frame member 74 and pushes the lower retaining layer against the forming dish. The length of time required depends upon the type of film being used, as well as the temperature of the oil in the drum. The temperature of the oil should be hot enough to form the film but not hot enough to degrade it.

The apparatus is further closed by activating the expandable piston raising cylinder 109, as illustrated in FIG. 13. The expanding cylinder raises the piston dish forming unit 66 until it presses against the convex rubber bladder of the drum. The film retaining layers and the circuit layer are now held between the convex rubber bladder and the concave forming dish. After the film has been thoroughly heated, air is evacuated from the piston chamber thus pulling the heated retaining layers and profiled circuit layer tightly against the forming dish. Any air remaining between the two retaining layers of thermoplastic film is also withdrawn through the holes 126 in the lower layer of retaining film 124 and the holes 70 in the forming dish 68. The arrows 69' in FIG. 13 illustrate the flow of air as it is evacuated from the piston chamber.

The apparatus is opened while the vacuum is still on. The drum member is raised to permit cooling of the formed switch. After an appropriate cooling time, the vacuum manifold is turned off, the piston dish portion is allowed to return to its lowest position and the frame member having the formed circuit layer is removed from the apparatus. For example, when the switch layer is a polyester film, the oil is heated to 300° F. and the drum remains in its partially closed position for approximately one minute. After the apparatus has been completely closed, the air in the piston chamber and surrounding the switch layer is evacuated. The drum member is then raised to its open position. Vacuum is maintained for 30 seconds to allow the layer to cool in the formed condition.

The spacing means in the preferred switch embodiment consists of a layer of flexible film having opening at the switch sites. This layer is profiled and formed in the same manner as the circuit layers. The switch is assembled by using a shaped circuit layer having conductors on the convex side, the shaped spacer, and shaped second circuit layer having its conductors on the concave surface. The edges are adhered together along their perimeters to form the switch assembly.

Other spacing means can be used, such as an ultraviolet curable polymer as disclosed in U.S. Pat. No. 4,449,023. The polymer spacer is deposited on the film layers prior to the forming of the layers. The spacer, therefore, is formed at the same time as the circuit layer. The switch, in this instance, is formed by adhering the formed layer having the conductors and spacers on the concave surface with a formed layer have the conductors and spacers on the convex surface.

The double hairline conductors of the preferred embodiment being only 5 mils or less wide are nearly invisible when the assembly is mounted on a cathode ray tube. A filter may be disposed over the assembly to give an essentially optically clear screen. Use of a filter also reduces glare from the CRT and protects the surface of the assembly.

The method of forming and the apparatus can also be used for hemispherically forming circuit layers that will be mounted to essentially hemispherical shaped surfaces wherein the spherical surface itself has one or more conductors deposited thereon. When forming these layers, the profiled circuit layer must be placed with the conductor layer uppermost against the top retaining layer of the thermoplastic film, so that the conductors will be on the concave surface of the shaped circuit layer. The switch is then assembled by placing a spacer between the curved circuit layer and the rigid hemispherical surface. This spacer can be a separate sheet of shaped film or can be a polymer screened on the circuit surface prior to forming.

It is understood that flexible film having conductors of various widths deposited thereon can be hemispherically shaped according to this method and with this apparatus. While this invention permits the hemispherical shaping of film having lines as narrow as 5 mils or less, it is not intended that it be limited to these narrow lines. Wider lines can certainly be used when optical clarity is not a factor to be considered.

What is claimed is:
1. A method for forming flexible film for attaching to generally hemispherical surfaces, the film being of the type used in membrane switches, one side of the film having electrical conductors thereon, the method being characterized by the steps of:
    applying conductors to one surface of a flat flexible film, to form a circuit layer,
    placing the flexible film circuit layer between two parallel retaining layers of thermoplastic film, the periphery of the circuit layer being freely held between the two retaining layers, clamping the retaining layers of film between concave and convex surfaces, transferring heat to at least one surface of the retaining layers until the circuit layer attains a hemispherical shape, applying a vacuum to the concave surface to hold the circuit layer in its formed condition as the heat is removed and the flexible film circuit layer is allowed to cool.

2. The method for forming flexible film for attaching to generally hemispherical surfaces as recited in claim 1, wherein the conductors are narrow electrodeposited conductors.

3. The method for forming flexible film for attaching to generally hemispherical surfaces as recited in claim 1 wherein the conductors are narrow screened ink conductors.

4. The method for forming flexible film for attaching to generally hemispherical surfaces as recited in claim 1, wherein a sheet of freely held flexible mesh is placed between the circuit layer and the lower retaining layer.

* * * * *